(12) United States Patent
Li et al.

(10) Patent No.: US 11,131,797 B2
(45) Date of Patent: Sep. 28, 2021

(54) BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Jinpeng Li, Beijing (CN); Ming Zhai, Beijing (CN); Pei Li, Beijing (CN); Zhiyuan Wang, Beijing (CN); Pengjun Cao, Beijing (CN); Jian Li, Beijing (CN); Teng Zhang, Beijing (CN); Zongying Shu, Beijing (CN); Yuanda Lu, Beijing (CN); Linxia Qi, Beijing (CN); Pei Qin, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/834,092

(22) Filed: Mar. 30, 2020

(65) Prior Publication Data

US 2021/0116623 A1 Apr. 22, 2021

(30) Foreign Application Priority Data

Oct. 22, 2019 (CN) .......................... 201911007525.7

(51) Int. Cl.
*F21V 8/00* (2006.01)
*F21V 13/00* (2006.01)
*F21Y 115/10* (2016.01)

(52) U.S. Cl.
CPC ............ *G02B 6/0031* (2013.01); *F21V 13/00* (2013.01); *G02B 6/0035* (2013.01); *F21Y 2115/10* (2016.08)

(58) Field of Classification Search
CPC ..... G02B 6/0031; G02B 6/0035; F21V 13/00; F21Y 2115/10
See application file for complete search history.

(56) References Cited

U.S. PATENT DOCUMENTS

| | | | |
|---|---|---|---|
| 2015/0098224 A1* | 4/2015 | Hong | H01L 33/08 362/257 |
| 2019/0013449 A1* | 1/2019 | Ogata | H01L 33/54 |
| 2019/0332844 A1* | 10/2019 | Liu | H01L 27/14678 |
| 2019/0346113 A1* | 11/2019 | Zhang | F21V 13/14 |
| 2020/0232618 A1* | 7/2020 | Rudy | F21S 43/251 |

* cited by examiner

*Primary Examiner* — Joseph L Williams
*Assistant Examiner* — Jose M Diaz
(74) *Attorney, Agent, or Firm* — Arent Fox LLP; Michael Fainberg

(57) ABSTRACT

Disclosed are a backlight module and a display device. The backlight module includes: a substrate and light emitting devices disposed on a side of the substrate, where each of the light emitting devices includes a light emitting diode, and a first connecting weld leg and a second connecting weld leg disposed between the light emitting diode and the substrate; the backlight module further includes a reflective layer between the substrate and the light emitting diodes; and for a same light emitting device, an orthographic projection of the reflective layer on the substrate and an area between orthographic projections of the first connecting weld leg and the second connecting weld leg on the substrate have an overlapping area.

14 Claims, 5 Drawing Sheets

BACKLIGHT MODULE AND DISPLAY DEVICE

CROSS REFERENCE TO RELATED APPLICATION

This application claims priority to Chinese Patent Application No. 201911007525.7, filed with the Chinese Patent Office on Oct. 22, 2019. The entire disclosure of the above application is incorporated herein by reference.

FIELD

The present disclosure relates to the field of display technology, and particularly to a backlight module and a display device.

BACKGROUND

Display devices are widely used due to many advantages such as a thin body, power saving, and no radiation. Examples include mobile phones, personal digital assistants (PDAs), digital cameras, computer screens, or laptop screens. A backlight-type display device in the related art includes a display panel and a backlight module.

SUMMARY

The present disclosure provides a backlight module and a display device.

In a first aspect, an embodiment of the present disclosure provides a backlight module, including:

a substrate and light emitting devices disposed on a side of the substrate, where each of the light emitting devices includes a light emitting diode, and a first connecting weld leg and a second connecting weld leg disposed between the light emitting diode and the substrate;

the backlight module further includes a reflective layer between the substrate and the light emitting diode; and for a same light emitting device, an orthographic projection of the reflective layer on the substrate and an area between orthographic projections of the first connecting weld leg and the second connecting weld leg on the substrate have an overlapping area.

In some embodiments, the backlight module further includes a first trace layer disposed between the substrate and the light emitting devices, where the first trace layer is insulated from the reflective layer; the first trace layer includes a plurality of first traces; the first connecting weld leg is connected to one of plurality of the first traces, and the second connecting weld leg is connected to another one of the plurality of first traces; and the reflective layer is disposed on the substrate and between the first traces.

In some embodiments, the backlight module further includes an adhesive layer disposed between the first trace layer and the substrate.

In some embodiments, the material of the adhesive layer includes a transparent adhesive material or a reflective adhesive material.

In some embodiments, the backlight module further includes a first trace layer disposed between the substrate and the light emitting devices, where the first trace layer is insulated from the reflective layer; the first trace layer includes a plurality of first traces; the first connecting weld leg is connected to one of the plurality of first traces, and the second connecting weld leg is connected to another one of the plurality of first traces; and the first trace layer is disposed between the reflective layer and the substrate.

In some embodiments, the orthographic projection of the reflective layer on the substrate covers an area other than the orthographic projections of the first connecting weld leg and the second connecting weld leg on the substrate.

In some embodiments, the orthographic projection of the reflective layer on the substrate overlaps an area between orthographic projections of the first connecting weld leg and the second connecting weld leg in each light emitting device on the substrate.

In some embodiments, the backlight module further includes a reflector disposed on a side of the first trace layer away from the substrate, and an orthographic projection of the reflector on the substrate overlaps an orthographic projection of an area between two adjacent light emitting diodes on the substrate.

In some embodiments, the orthographic projection of the reflective layer on the substrate and an orthographic projection of a gap between every adjacent two of the first traces on the substrate have an overlapping area.

In some embodiments, the material of the substrate is a white base material.

In a second aspect, an embodiment of the present disclosure further provides a display device including the above-mentioned backlight module and a display panel located on a light outgoing side of the backlight module.

DETAILED DESCRIPTION OF THE EMBODIMENTS

Figure 1:
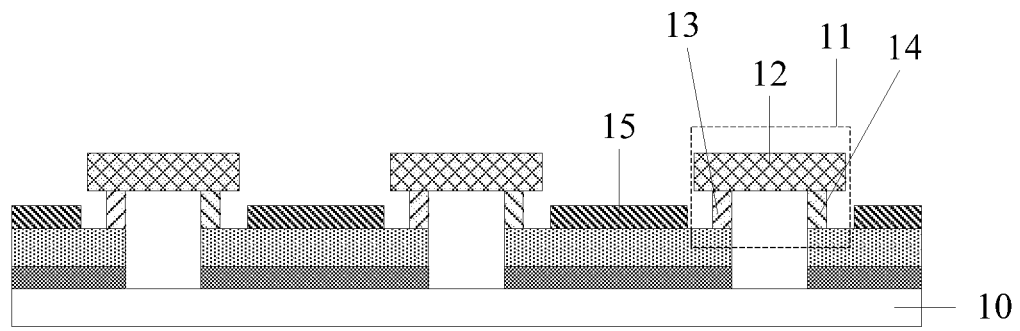
FIG. 1 is a schematic structural diagram of a backlight module in the related art.

To make the objects, technical solutions and advantages of the embodiments of the present disclosure more apparent, the technical solutions in the embodiments of the present disclosure will be described clearly and completely with reference to the drawings in the embodiments of the present disclosure. Obviously, the described embodiments are only a part of the embodiments of the present disclosure, and not all the embodiments. Moreover, the embodiments in the present disclosure and the features in the embodiments can be combined with each other without conflict. Based on the embodiments described herein, all other embodiments obtained by those of ordinary skill in the art without any inventive effort shall fall into the protection scope of the present disclosure.

Unless otherwise defined, technical or scientific terms used in the present disclosure shall have the ordinary meanings understood by those of ordinary skill in the art to which the present disclosure pertains. The terms "first", "second" and the like used in present disclosure do not indicate any order, quantity or importance, but are only used to distinguish different components. Words such as "comprise" or "include" indicate that an element or item appearing before such a word covers listed elements or items appearing after the word and equivalents thereof, and does not exclude other elements or items. Words such as "connect" or "connect with" are not limited to physical or mechanical connections, but may include electrical connections, whether direct or indirect.

It should be noted that sizes and shapes in the drawings do not reflect the true scale, and are merely intended to schematically illustrate the present disclosure. Furthermore, same or similar reference numerals throughout represent same or similar elements or elements having same or similar functions.

A backlight module in the related art, as shown in FIG. 1, can include a substrate 10 and light emitting devices 11 disposed on a side of the substrate 10, where each light emitting device 11 includes a light emitting diode 12, and connecting weld legs 13 and 14 disposed between the light emitting diode 12 and the substrate 10. Furthermore, the backlight module further includes reflectors 15 disposed between the light emitting diodes 12. For the backlight module in the related art, a high voltage or current is input to the backlight module to improve the light extraction efficiency of the backlight module. However, this can cause an increase of the power consumption of the backlight module, and also cause the backlight module to generate much heat.

Figure 2A:
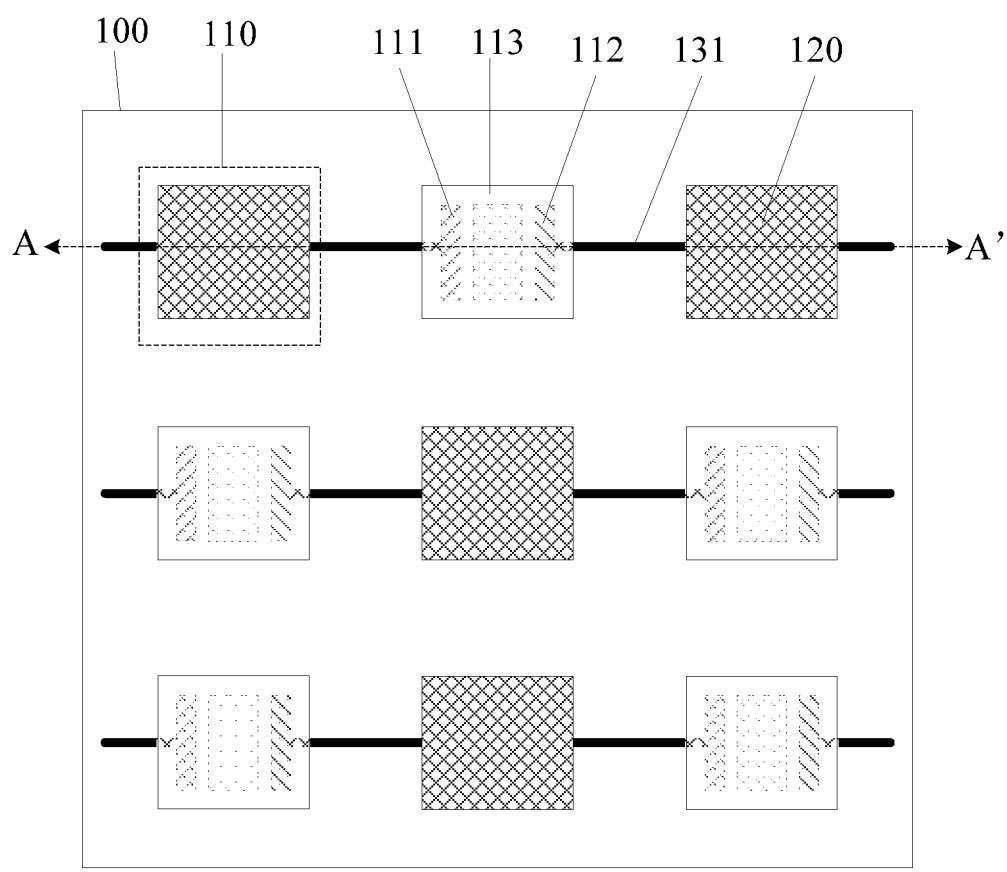
FIG. 2A is a top view of a backlight module provided in an embodiment of the present disclosure.
Figure 2B:
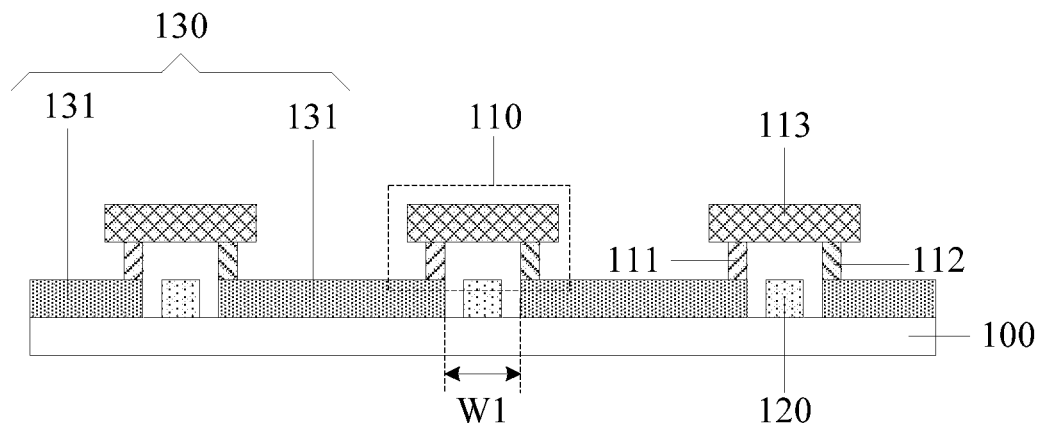
FIG. 2B is a cross-sectional view of the backlight module taken along the line AA' indicated in FIG. 2A.

In view of this, an embodiment of the present disclosure provides a backlight module, as shown in FIGS. 2A and 2B, the backlight module includes a substrate 100 and light emitting devices 110 disposed on a side of the substrate 100, where each light emitting device 110 includes a light emitting diode 113, and a first connecting weld leg 111 and a second connecting weld leg 112 disposed between the light emitting diode 113 and the substrate 100. Furthermore, the backlight module further includes a reflective layer 120 disposed between the substrate 100 and light emitting diodes 113, and an orthographic projection of the reflective layer 120 corresponding to a light emitting device 110 on the substrate 100 and an area between orthographic projections of the first connecting weld leg 111 and the second connecting weld leg 112 in the same light emitting device 110 on the substrate 100 have an overlapping area.

In the backlight module provided in the embodiment of the present disclosure, a reflective layer 120 is disposed between the substrate 100 and the light emitting diode 113, and an orthographic projection of the reflective layer 120 on the substrate 100 and an area between orthographic projections of the first connecting weld leg 111 and the second connecting weld leg 112 in the same light emitting device 110 on the substrate 100 have an overlapping area, so that emergent light from a side of the light emitting diode 113 facing the substrate 100 can be reflected by the reflective layer 120 to increase the brightness of light from the front side of the backlight module, hereby improving the light extraction efficiency of the backlight module.

In some embodiments, the material of the reflective layer 120 can include a material with high reflectivity, such as a white ink or a metal material. The metal material can be, for example, gold, silver, copper, aluminum, or the like. Of course, this can be designed and determined according to the actual application environment, and is not limited herein.

In some embodiments, the light emitting diode 113 can be a micro light emitting diode (micro LED) or a mini light emitting diode (mini LED). Such a micro-sized LED has the characteristics of high efficiency, high brightness, high reliability, quick response, and the like.

As shown in FIGS. 2A and 2B, the light emitting device 110 includes a first connecting weld leg 111 and a second connecting weld leg 112 disposed between the light emitting diode 113 and the substrate 100. The substrate 100 is generally provided with a trace for external signal and electric connections, and the trace is used for transmitting a signal for driving an LED chip to emit light.

Figure 3A:
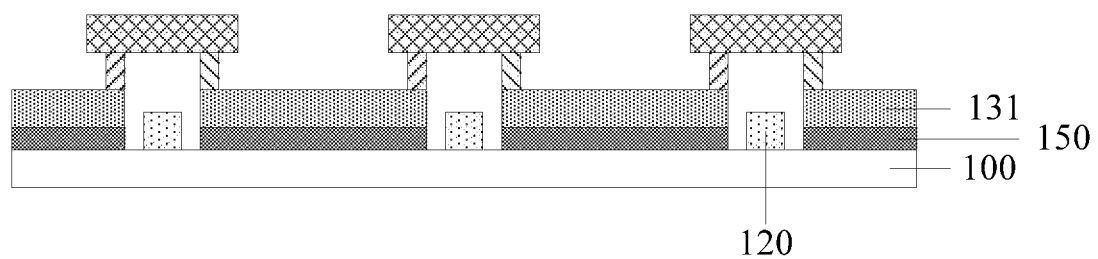
FIG. 3A is a cross-sectional view of another backlight module provided in an embodiment of the present disclosure.

In some embodiments, as shown in FIG. 3A, the backlight module further includes a first trace layer 130 disposed between the substrate 100 and the light emitting devices 110, where the first trace layer 130 is disposed to be insulated from the reflective layer 120; the first trace layer 130 includes a plurality of first traces 131; the first connecting weld leg 111 is connected to one of the first traces 131, and the second connecting weld leg 112 is connected to another one of the first traces 131. In this way, signals can be input, through the first traces 131, to the first connecting weld leg 111 and the second connecting weld legs 112 connected thereto, so as to drive the light emitting diode 113 to emit light.

In some embodiments, the material of the first trace layer 130 can include a metal material, such as gold, silver, copper, aluminum, or the like. Of course, this can be designed and determined according to the actual application environment, and is not limited here.

In some embodiments, as shown in FIGS. 2A and 2B, the orthographic projection of the reflective layer 120 on the substrate 100 and only an area between orthographic projections of the first connecting weld leg 111 and the second connecting weld leg 112 in each light emitting device 110 on the substrate 100 have an overlapping area. Furthermore, there is a gap between the orthographic projection of the reflective layer 120 on the substrate 100 and the orthographic projection of each of the first connecting weld leg 111 and the second connecting weld leg 112 in each light emitting device 110 on the substrate 100. In this way, the emergent light from the side of the light emitting diode 113 facing the substrate 100 can be reflected as much as possible, to further improve the light extraction efficiency.

In some embodiments, as shown in FIG. 2B, the reflective layer 120 can be disposed on the substrate 100 and between the first traces 131. In some embodiments, in a preparation process, when the material of the reflective layer 120 is a white ink, the reflective layer 120 can be prepared first, and then the first trace layer 130 is prepared. In some embodiments, there may be a first gap W1 between the first traces 131 with the orthographic projection thereof on the substrate 100 covered by the orthographic projection of the light emitting diode 113 on the substrate 100. To reduce the thickness of the backlight module, the reflective layer 120 can be located in the first gap W1. In some embodiments, when the material of the reflective layer 120 is a metal material, the reflective layer 120 is prepared first, then an insulating layer is prepared, and then the first trace layer 130 is prepared.

To improve the light extraction efficiency of the backlight module, in some embodiments, as shown in FIG. 2B, the material of the substrate can be a white base material. For example, the material of the substrate is at least one of a PI (polyimide) material, a FR4 material, and a BT (Bismaleimide Triazine) material. In this way, light incident by the light emitting diode 113 to the area between adjacent light emitting diodes 113 can be reflected by the substrate, to further improve the light extraction efficiency.

In some embodiments, as shown in FIG. 3A, the backlight module can further include an adhesive layer 150 disposed between the first trace layer 130 and the substrate 100. As the material of the reflective layer 120 is a white ink or a metal material, when the first trace layer 130 is disposed on the substrate 100, its adhesive force may be reduced. Thus, the first trace layer 130 is adhered to the substrate 100 through the adhesive layer 150 to improve the adhesion between the first trace layer 130 and the substrate 100. Furthermore, the adhesive layer 150 can also be used as an insulating layer to insulate the reflective layer 120 from the first trace layer 130. In some embodiments, the adhesive layer 150 is prepared after preparing reflective layer 120, and the trace layer 130 is prepared after preparing the adhesive layer 150, in this way, the adhesive layer 150 can be used as an insulating layer to insulate the reflective layer 120 from the first trace layer 130, so that an additional insulating layer is not needed, thereby reducing the process flow.

In some embodiments, the material of the adhesive layer 150 can include a transparent adhesive material. In some embodiments, the material of the adhesive layer 150 can also include a reflective adhesive material. This can further improve the reflectivity and further improve the light extraction efficiency.

Figure 3B:
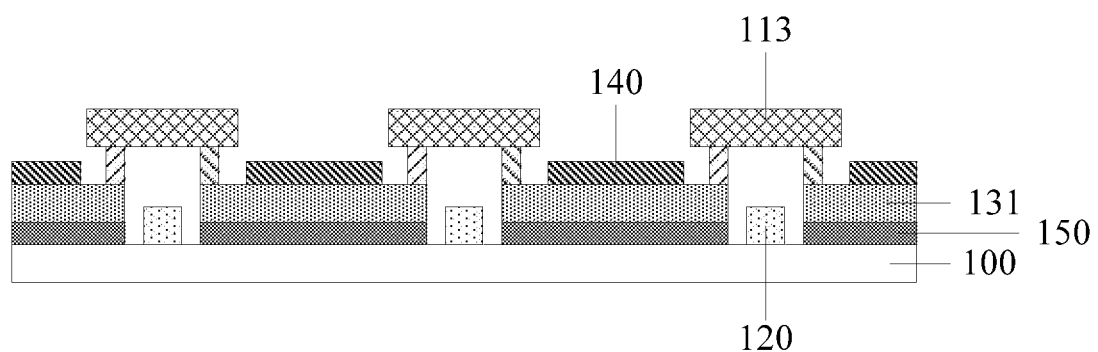
FIG. 3B is a cross-sectional view of yet another backlight module provided in an embodiment of the present disclosure.

To improve the light extraction efficiency of the backlight module, in some embodiments, as shown in FIG. 3B, the backlight module can further include a reflector 140 on a side of the first trace layer 130 facing away from the substrate 100. An orthographic projection of the reflector 140 on the substrate 100 overlaps an orthographic projection of an area between two adjacent light emitting diodes 113 on the substrate 100. In this way, the reflector 140 is provided between the adjacent light emitting devices 110 to reflect the light incident to the area between the light emitting diodes 113 by the light emitting diodes 113, thereby further improving the light extraction efficiency.

Figure 7:
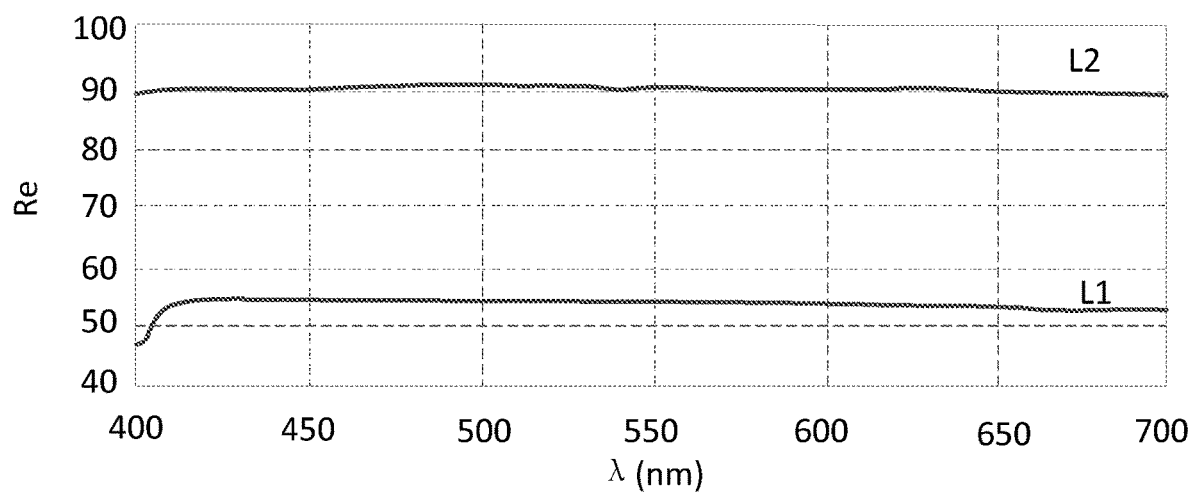
FIG. 7 illustrates the reflectivity of different wave lengths using the backlight module provided in an embodiment of the present disclosure.

Using the backlight module shown in FIG. 1 and the backlight module shown in FIG. 3B respectively as examples below, the reflectivity for light having a wavelength λ, within the range of 400 nm to 700 nm is detected respectively to obtain detection results as shown in FIG. 7. The abscissa represents the wavelength, and the ordinate represents the reflectivity. L1 represents the reflectivity for light having a wavelength λ, within the range of 400 nm to 700 nm of the backlight module shown in FIG. 1, and L2 represents the reflectivity for light having a wavelength λ within the range of 400 nm to 700 nm of the backlight module shown in FIG. 3B. It can be seen from FIG. 7 that for the light of the same wavelength, the reflectivity of the backlight module shown in FIG. 3B for the light of that wavelength is greater than the reflectivity of the backlight module shown in FIG. 1 for the light of the wavelength λ. Therefore, as the reflective layer is provided in the embodiment of the present disclosure, the reflectivity of the backlight module can be further improved, so that a high voltage or current may be not input to the backlight module, thereby reducing the power consumption of the backlight module and avoiding the problem of generating much heat by the backlight module.

Figure 4A:
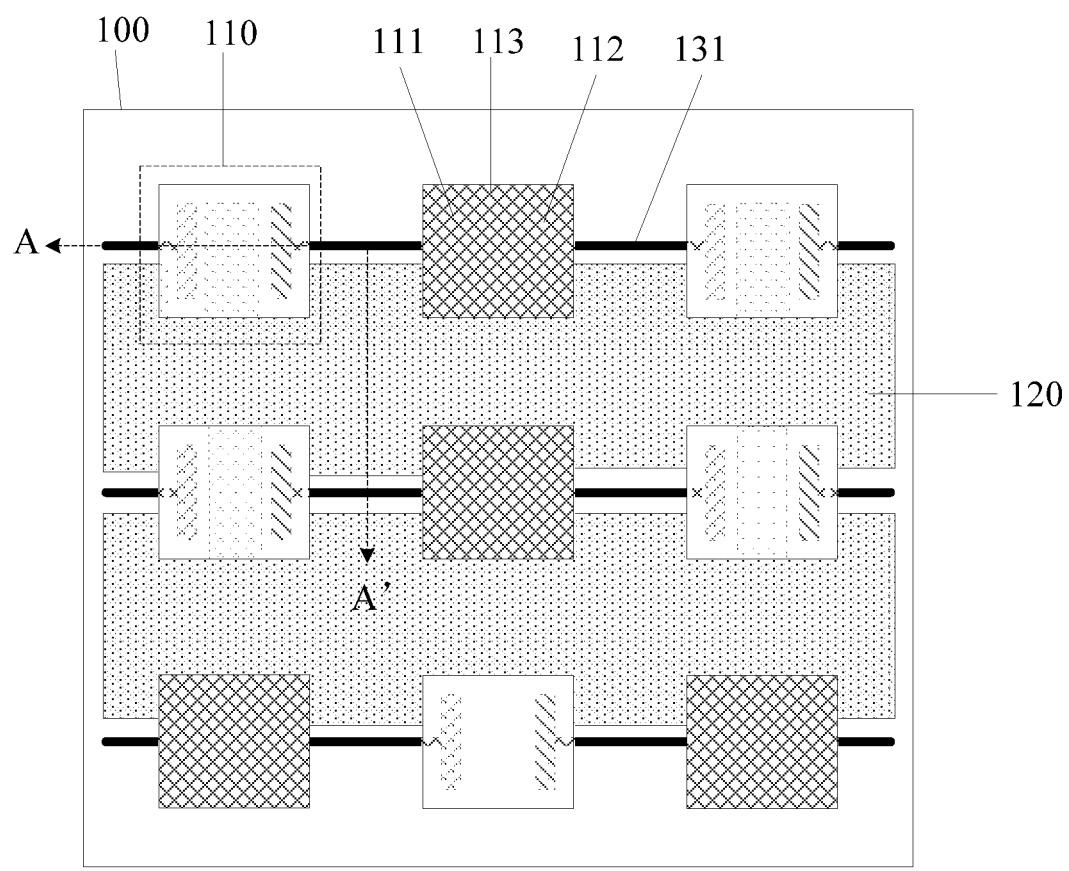
FIG. 4A is a top view of still another backlight module provided in an embodiment of the present disclosure.
Figure 4B:
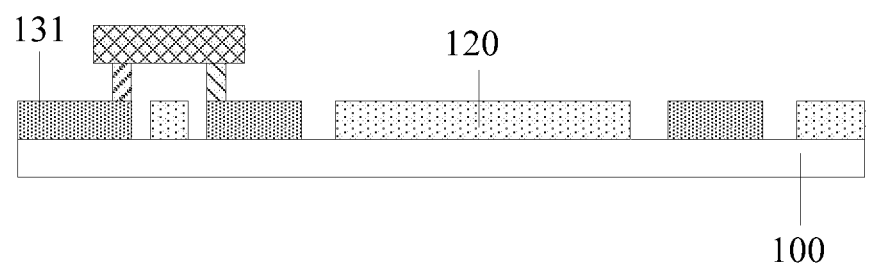
FIG. 4B is a cross-sectional view of the backlight module taken along the line AA' indicated in FIG. 4A.

In some embodiments, as shown in FIG. 2B, FIGS. 4A and 4B, the orthographic projection of the reflective layer 120 on the substrate 100 and an orthographic projection of a gap between every adjacent two first traces 131 on the substrate 100 have an overlapping area. Furthermore, there is a gap between the orthographic projection of the reflective layer 120 on the substrate 100 and the orthographic projection of each first trace 131 on the substrate 100. Thus, when the material of the first trace 131 is a metal material—as the metal material has reflecting property, and the reflective layer 120 also having reflecting property is provided in the gap between the first traces 131, the first traces 131 and the reflective layer 120 can achieve the effect of the above-mentioned reflectors 140, so that the additional reflectors 140 may be omitted, thereby reducing the process flow and production cost. Of course, reflectors 140 may also be further provided to further improve the light extraction efficiency.

Figure 5:
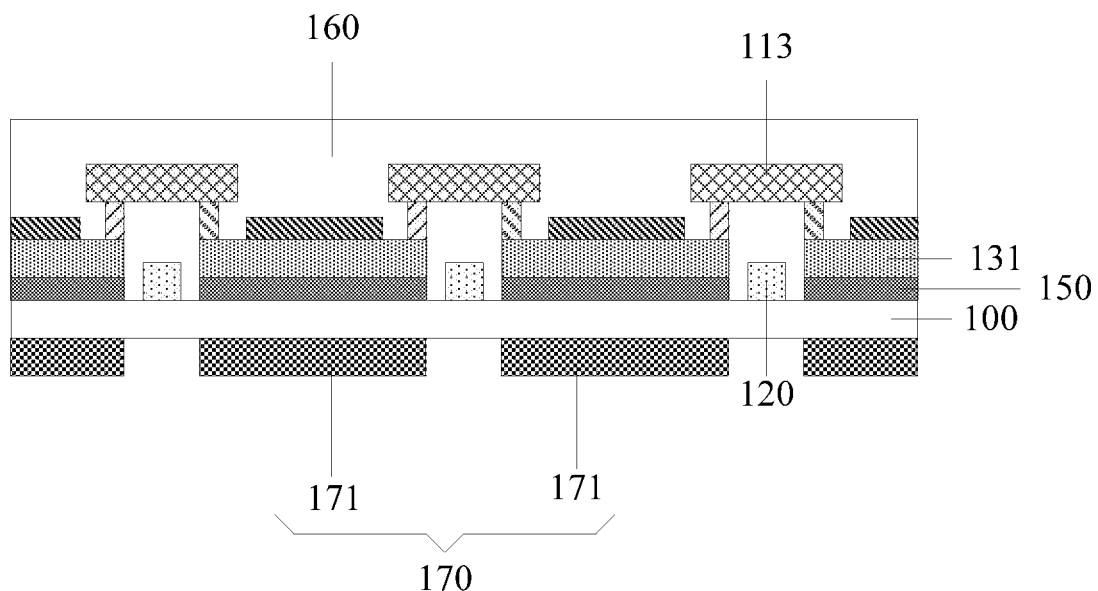
FIG. 5 is a cross-sectional view of a still yet another backlight module provided in an embodiment of the present disclosure.

In some embodiments, as shown in FIG. 5, the backlight module can further include a protective layer 160 on a side of the light emitting diodes 113 away from the substrate 100, and a second trace layer 170 on a side of the substrate 100 away from the light emitting diodes 113. The protective layer 160 is used for protecting the light emitting diodes 113. The second trace layer 170 has a plurality of second traces 171. In some embodiments, some of the light emitting devices are connected in series into a string light, and the backlight module has a plurality of string lights. One second trace 171 is connected to one string light. Of course, the configuration may be substantially same as that in the related art, and details are not described herein.

Figure 6:
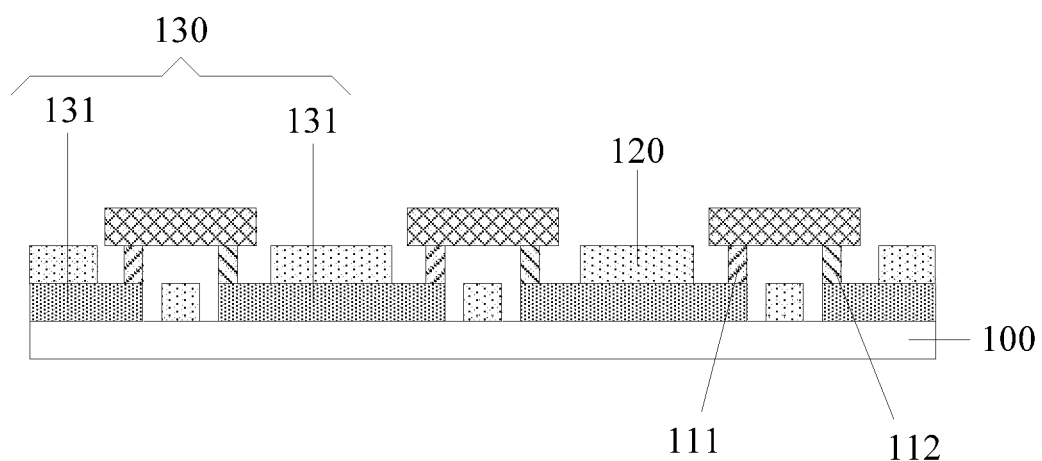
FIG. 6 is a cross-sectional view of a further backlight module provided in an embodiment of the present disclosure.

In some embodiments, as shown in FIG. 6, the first trace layer 130 may also be disposed between the reflective layer 120 and the substrate 100. That is, in some embodiments, when the material of the reflective layer 120 is a white ink, the first trace layer 130 is prepared first, and then the reflective layer 120 is prepared. In some embodiments, there may be a first gap between the first traces 131 covered by the orthographic projection of the light emitting diode 113 on the substrate 100. To reduce the thickness of the backlight module, the reflective layer 120 can be located in the first gap. In some embodiments, when the material of the reflective layer 120 is a metal material, the first trace layer 130 is prepared first, then an insulating layer is prepared, and then the reflective layer 120 is prepared.

In some embodiments, as shown in FIG. 6, when the first trace layer 130 is disposed between the reflective layer 120 and the substrate 100, the orthographic projection of the reflective layer 120 on the substrate 100 covers an area other than the orthographic projections of the first connecting weld leg 111 and the second connecting weld leg 112 on the substrate 100. In this way, the reflective layer 120 can also be used as reflectors 140, so that the additional reflectors 140 may be omitted, thereby reducing the process flow and production cost.

Based on the same inventive concept, an embodiment of the present disclosure further provides a display device including the above-mentioned backlight module and a display panel located on a light outgoing side of the backlight module. The problem solving principle of the display device is similar to that of the aforementioned backlight module, and thus, for the implementation of the display device, reference can be made to the implementation of the aforementioned backlight module.

In some embodiments, the display device can be a mobile phone, a tablet computer, a television, a display, a notebook computer, a digital photo frame, a navigator, or any other product or component with a display function. Other indispensable components of the display device are present as understood by those skilled in the art, and are not described here, nor should they be construed as limiting the present disclosure.

In the backlight module and the display device provided in the embodiments of the present disclosure, a reflective layer is disposed between the substrate and the light emitting diodes, and an orthographic projection of the reflective layer on the substrate has an overlapped area with an area between orthographic projections of the first connecting weld leg and the second connecting weld leg in the same light emitting device on the substrate, so that emergent light from a side of the light emitting diode facing the substrate can be reflected by the reflective layer to increase the brightness of light from the front side of the backlight module, hereby improving the light extraction efficiency of the backlight module.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A backlight module, comprising:
   a substrate;
   light emitting devices disposed on a side of the substrate, wherein each of the light emitting devices comprises a light emitting diode, and a first connecting weld leg and a second connecting weld leg disposed between the light emitting diode and the substrate, and one end of the first connecting weld leg and one end of the second connecting weld are provided out of the light emitting diode; and
   a reflective layer between the substrate and the light emitting diodes, and configured to reflect emergent light from a side of the light emitting diodes facing the substrate;
   wherein for a same light emitting device, an orthographic projection of the reflective layer on the substrate and an area between orthographic projections of the first connecting weld leg and the second connecting weld leg on the substrate have an overlapping area.

2. The backlight module according to claim 1, wherein the backlight module further comprises a first trace layer disposed between the substrate and the light emitting devices;
   wherein the first trace layer is insulated from the reflective layer, and the first trace layer comprises a plurality of first traces; wherein the first connecting weld leg is connected to one of the plurality of first traces, and the second connecting weld leg is connected to another one of the plurality of first traces; and
   the reflective layer is disposed on the substrate and between the first traces.

3. The backlight module according to claim 2, wherein the backlight module further comprises an adhesive layer disposed between the first trace layer and the substrate.

4. The backlight module according to claim 3, wherein a material of the adhesive layer comprises a transparent adhesive material or a reflective adhesive material.

5. The backlight module according to claim 1, wherein the backlight module further comprises a first trace layer disposed between the substrate and the light emitting devices;
   wherein the first trace layer is insulated from the reflective layer, and the first trace layer comprises a plurality of first traces; wherein the first connecting weld leg is connected to one of the plurality of first traces, and the second connecting weld leg is connected to another one of the plurality of first traces; and
   the first trace layer is disposed between the reflective layer and the substrate.

6. The backlight module according to claim 5, wherein the orthographic projection of the reflective layer on the substrate covers an area other than the orthographic projections of the first connecting weld leg and the second connecting weld leg on the substrate.

7. The backlight module according to claim 2, wherein the orthographic projection of the reflective layer on the substrate overlaps an area between orthographic projections of the first connecting weld leg and the second connecting weld leg in each light emitting device on the substrate.

8. The backlight module according to claim 7, wherein the backlight module further comprises a reflector disposed on a side of the first trace layer away from the substrate, and an orthographic projection of the reflector on the substrate overlaps an orthographic projection of an area between two adjacent light emitting diodes on the substrate.

9. The backlight module according to claim 5, wherein the orthographic projection of the reflective layer on the substrate overlaps an area between orthographic projections of the first connecting weld leg and the second connecting weld leg in each light emitting device on the substrate.

10. The backlight module according to claim 9, wherein the backlight module further comprises a reflector on a side of the first trace layer away from the substrate, and an orthographic projection of the reflector on the substrate overlaps an orthographic projection of an area between two adjacent light emitting diodes on the substrate.

11. The backlight module according to claim 2, wherein the orthographic projection of the reflective layer on the substrate and an orthographic projection of a gap between every adjacent two of the first traces on the substrate have an overlapping area.

12. The backlight module according to claim 5, wherein the orthographic projection of the reflective layer on the substrate and an orthographic projection of a gap between every adjacent two of the first traces on the substrate have an overlapping area.

13. The backlight module according to claim 1, wherein a material of the substrate is a white base material.

14. A display device, comprising the backlight module of claim 1, and a display panel disposed on a light outgoing side of the backlight module.

* * * * *